Figure 1:
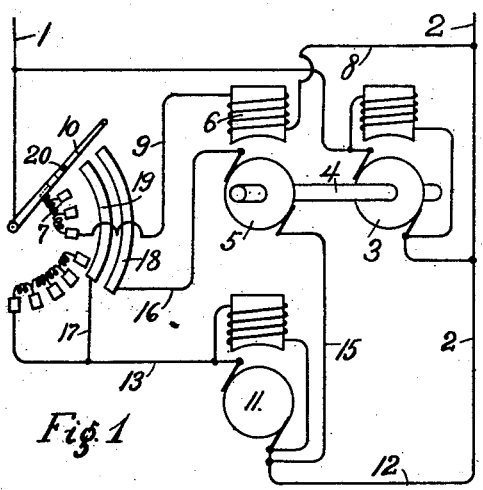

No. 714,210. Patented Nov. 25, 1902.
R. T. LOZIER.
MOTOR REGULATION.
(Application filed Apr. 2, 1900.)

(No Model.) 2 Sheets—Sheet 1.

Witnesses
Ivan Konigsberg
Lester C. Taylor

Robert T. Lozier Inventor
By his Attorney
C. W. Edwards

No. 714,210. Patented Nov. 25, 1902.
R. T. LOZIER.
MOTOR REGULATION.
(Application filed Apr. 2, 1900.)
(No Model.) 2 Sheets—Sheet 2.

Witnesses
Ivan Konigsberg.
Lester C. Taylor

Robert T. Lozier Inventor
By his Attorney
C. W. Edwards

UNITED STATES PATENT OFFICE.

ROBERT T. LOZIER, OF NEW YORK, N. Y.

MOTOR REGULATION.

SPECIFICATION forming part of Letters Patent No. 714,210, dated November 25, 1902.

Application filed April 2, 1900. Serial No. 11,056. (No model.)

*To all whom it may concern:*

Be it known that I, ROBERT T. LOZIER, a citizen of the United States, residing at the city of New York, in the county of New York and State of New York, have invented certain new and useful Improvements in Motor Regulation, of which the following is a full, clear, and exact specification.

My invention relates to the art of motor regulation, and has particular reference to the means for starting and operating electric motors under load. Its object is to provide a simple and efficient means for starting an electric motor under load quickly and without shock to the motor, which means shall at all times be in condition for immediate use.

In certain applications of electricity motors are operated under conditions wherein the torque necessary to start the motor under its load greatly exceeds that necessary to continue it in operation, and under some conditions this torque is irregular and varies with the different conditions of the machinery. Frequently the time required to start the motor is in itself an element of importance. These conditions are illustrated in the operation of cranes and hoisting machinery by direct-connected motors, where it is of importance that the motor shall start smoothly and without shock under its load in a minimum space of time irrespective of the conditions of the load. Furthermore, in the operation of this class of machinery it is necessary to continually stop and start the motor, and it is therefore of importance that the apparatus for starting the motor shall at all times stand ready to perform its functions, shall be simple and operated from one position by a single device, which shall accurately control all the movements of the apparatus, that the accelerations of speed of the motor be gradual and easy, and that the apparatus shall be capable of handling the heavy currents involved without injurious sparking. I propose in carrying out my invention to provide means whereby the current may be drawn from a common source of supply and delivered to the motor at first in a large quantity and at low voltage and then the voltage quickly raised to a point where the counter electromotive force generated by the working motor is sufficiently high to permit the current from the source of supply to be introduced to the motor with safety and whereby when this is done connections will be made between the supply-mains and the motor and the device by which the current is transformed be disconnected from the motor. In practice any suitable motor-dynamo may be utilized for the purpose of transforming the current.

The invention will be more particularly described with reference to the forms thereof illustrated in the accompanying drawings, in which—

Figure 2:
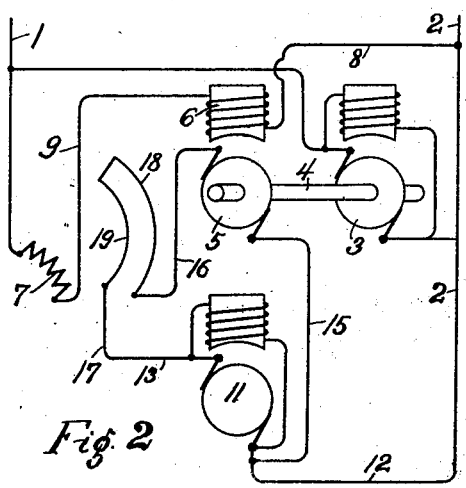
Figure 3:
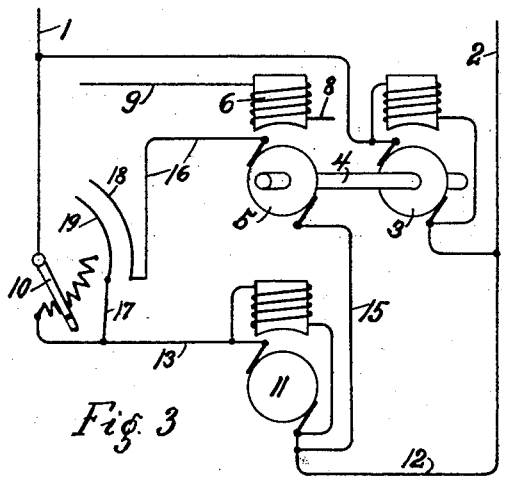
Figure 4:
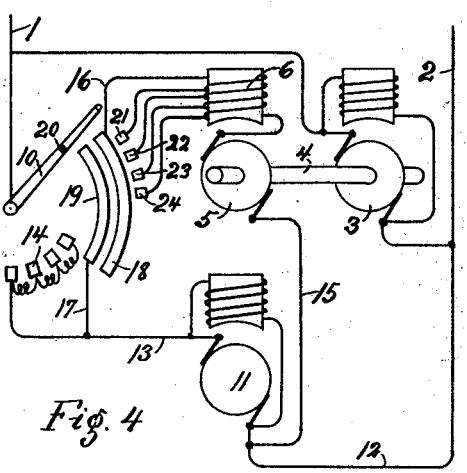
Figure 5:
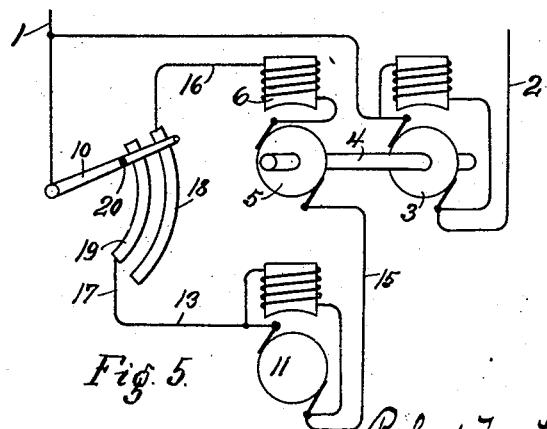
Figure 6:
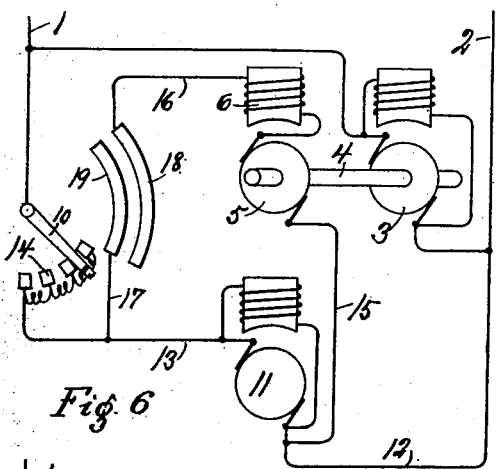
Figure 7:
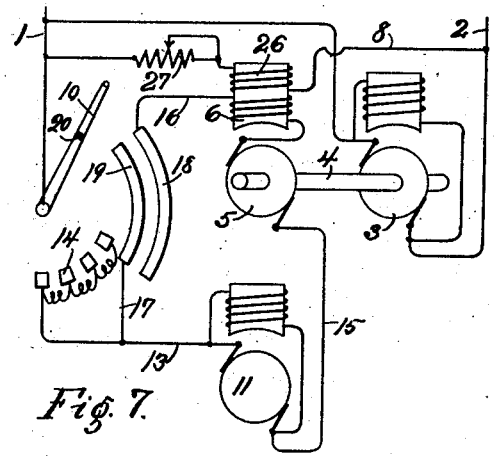
Figure 8:
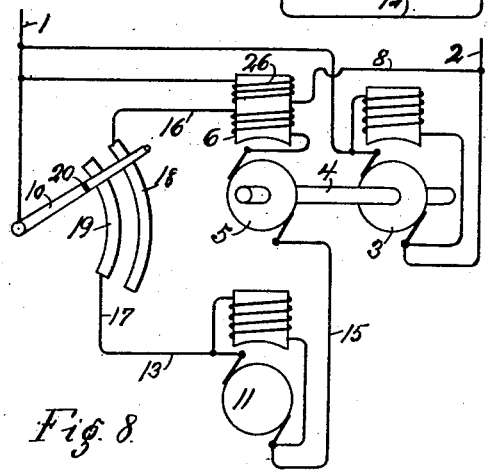
Figure 9:
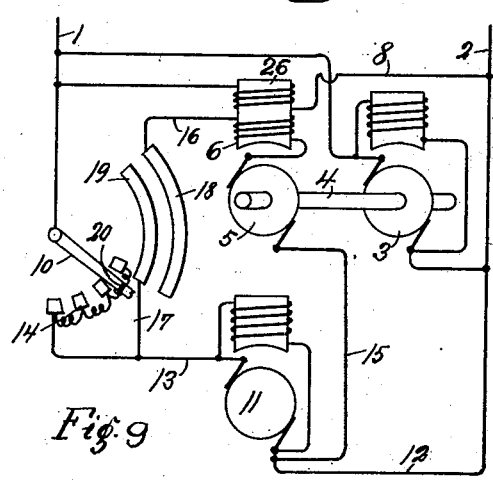
Figure 10:
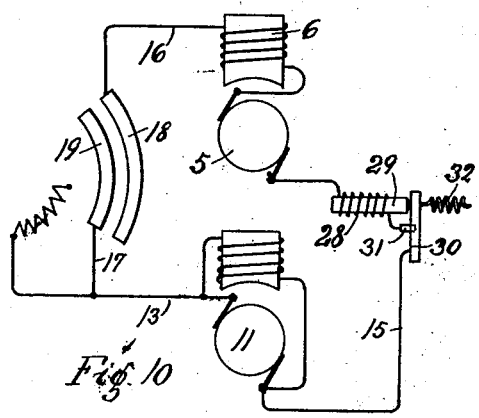

Figure 1 is a diagram illustrating the parts and connections of a system embodying my invention. Figs. 2 and 3 are detail diagrams illustrating the circuits of Fig. 1 at starting and subsequent positions. Fig. 4 is a diagram illustrating the parts and connections of a modified system. Figs. 5 and 6 are diagrams of the circuits of Fig. 4. Fig. 7 illustrates the parts and connections of a still further modified system. Figs. 8 and 9 are diagrams illustrating the connections of Fig. 7, and Fig. 10 is a detail illustrating means for causing the circuit from the motor to break automatically.

Referring more particularly to the construction shown in Fig. 1, 1 and 2 respectively represent the terminals of the supply-circuit from which the working motor is to be driven. Connected across the supply-circuit is the motor end 3 of a suitable converting device 4, which is in this instance illustrated as a motor-dynamo. 5 illustrates the dynamo end of the motor-dynamo. The field 6 is arranged to be connected across the supply-circuit through the resistance 7 by wires 8 and 9 and the lever 10 of a suitable controller. The main motor is represented in the drawings by 11. A wire 12 connects the motor with one of the leads of the supply-circuit, and a wire 13 connects it to a set of resistances 14, the latter being in the path of and adapted to make contact with the lever 10. The wire 15 connects the dynamo 5 with the motor, and wires 16 and 17, respectively, connect dynamo 5 and motor 11 with the contact-plates 18 and 19, which latter are adapted to make contact with and be connected by the lever 10. The lever 10 should be insulated with suitable insulation 20 between the resistances 7 and 14 and the contact-plates 18 and 19.

In the operation of the device above described the current flowing across the supply-mains through the motor end of the motor-dynamo will continuously operate the latter, and thus cause the continuous rotation of the armature of the generator 5 (shown in Fig. 1) while the latter is in use. The resistances 7 are so adjusted that when the apparatus is in position shown in Fig. 1 the current flowing through wire 9, field 6, and wire 8 will be negligible or so small as to not enable dynamo 5 to start motor 11, or the lever may be moved to the left, so that no current whatever will flow through the field 6. At this time, also, the lever does not connect the plates 18 and 19, and therefore the circuit from the dynamo end of the motor-dynamo to the motor is broken. In this position the motor will be at rest. In starting the lever 10 is first moved to make contact with the resistances 7, which introduces current to the field 6, causing dynamo 5 to generate current. A further movement causes the lever 10 to connect the plates 18 and 19, and thus close the circuit from the dynamo 5 through wire 16, plate 18, lever 10, plate 19, wire 17, motor 11, and wire 15 to the dynamo 5. Further movement of the lever gradually cuts out the resistance 7 and allows the field 6 to increase until its full strength is reached, by which time the dynamo will have given forth current of low voltage in sufficient quantity to effect the start of the motor 11 and its operation at low speed. Still further movement of the lever 10 brings it in contact with the resistances 14, at which time current will flow from the supply-main 1 through lever 10, resistance 14, wire 13 into the motor 11, and thence through wire 12 to the supply-main 2. As the lever 10 is moved still farther forward it leaves the resistance 7, which breaks the circuit through the field of the generator 5, and thus renders it ineffective, and also moves away from the plates 18 and 19, which breaks the circuit from the generator 5 through the motor. As the lever is moved farther over the resistance 14 is cut out and the motor 11 brought up to its full speed.

The converting device 4 may be of any suitable character—such, for instance, as the motor-dynamo shown in the drawings or an independent generator operated from any suitable source of power. Its capacity will of course vary according to the size of the working motor and according to individual conditions. The controller may of course be a simple lever with resistances, as shown in the drawings, or may be of any other suitable type. Likewise the controller will be arranged to make the various connections largely according to individual conditions—that is, the connections may be made so that the circuit from the dynamo 5 through the motor will be closed at the same time that the field 6 is energized instead of immediately afterward, and the time at which the circuit through the field 6 and from the dynamo 5 through the motor are broken may be slightly before or at the same time or after the main-line current is introduced through the resistance 14 to the motor. These various connections may, if preferred, be secured through separate automatically-operating switches controlled by one controller or put in motion by a single movement. To secure a uniform operation of the motor 11, I prefer the arrangement shown in the drawings, wherein current is introduced from the main line to the motor before the circuit from the dynamo 5 to the motor is broken. The resistances may, however, be adjusted in various ways to secure this even transfer of the motor from the circuit of the dynamo 5 to the main line. Another method of securing an even transfer is by placing an automatic circuit-opener in the circuit from the dynamo 5 through the motor, as will hereinafter be described.

Referring to Figs. 4, 5, and 6 of the drawings, a modified system is there shown. In this instance the same parts are employed—i. e., a supply-circuit 1 2, a converting device 4, comprising a motor 3, and a dynamo 5, a controller a, resistance 14, and motor 11. In this instance, as above described, the motor 11 is connected by wire 15 with the dynamo 5 and the latter by wire 16 to plate 18, which is connected through lever 10 to plate 19, the latter being connected to motor 11 by wire 17. The resistances 14 are connected to motor 11 by wire 13. The connections in this modification, however, differ from those above described in that the dynamo 5 is series wound, and by reason of this the resistance 7 may be omitted. The operation of the system shown in this modification is as follows: Movement of the lever 10 first connects plates 18 and 19 and closes a circuit from dynamo 5 through its field 6, wire 16, plate 18, lever 10, plate 19, wire 17, motor 11, and wire 15 to the dynamo 5. Inasmuch as the armature of dynamo 5 is being continually rotated when the circuit through its field is closed, its current and voltage will increase as the saturation of its field increases until it delivers its full current and voltage, which will of course have been previously calculated to be sufficient to perform the starting work. The lever 10 is then moved over to make contact with the resistance 14, which allows current from the main line to enter the motor through the resistance. At about the same time the lever moves out of contact with the plates 18 and 19, thus breaking the circuit from dynamo 5 through the motor. If preferred, shunt-resistance 21 22 23 24 25 may be introduced between the plates 18 and the armature of the dynamo 5, thus allowing more or less of the current to be shunted around the field 6 to vary the strength of the same. This will enable the output of the dynamo 5 to be regulated for slow speeds &c. The point at which the circuit from the dynamo 5 to the motor is broken and the value of the resistance 14 will of course be calculated to suit individual conditions.

In Figs. 7 to 9 a still further modification of the system is shown. Here the motor 3 of the converting device is connected across the line, as above described, and a portion of the field of the dynamo 5 is in series with the motor, as above described, and an independent shunt-coil 26 is placed upon the field of the dynamo. The shunt-coil 26 is connected across the line through a variable resistance 27. The operation of the apparatus shown in this modification will be substantially the same as that shown in Figs. 4, 5, and 6, with the exception that owing to the constant partial excitation of the field by the coil 26 it will be brought up to saturation more quickly when the circuit across plates 18 and 19 is closed than with the arrangement before described.

If preferred, the circuit from the dynamo 5 through the motor may be arranged to be automatically opened by an automatic circuit-opener—such, for illustration, as the one shown in Fig. 10—wherein a coil 28 is connected with the wire 15 and is adapted to energize a core 29, which is mechanically connected to a blade 30, the latter being connected to wire 15 and adapted to make contact with a contact 31. A spring 32 is connected to the blade 30 to open the circuit when the magnet becomes so weak that it cannot overcome the force of the spring.

It will be found in practice that the field of the dynamo 5 may be quickly brought up from zero to its full strength and that in so doing no sparking will occur at the controller. Furthermore, the transformed current from the supply-circuit is introduced to the motor-circuit at the proper voltage to properly start the motor, and as soon as the starting operation has been accomplished and such preliminary speeds as may be desired obtained the motor is operated from the main line and dynamo 5 dispensed with.

It will be understood, of course, that the dynamo 5 may be operated from any convenient source and that the same or equivalent parts of the apparatus may be employed in all the various modifications of the invention as in any of the illustrated forms.

Instead of using shunt-coils to vary the field of the dynamo 5, as illustrated in Fig. 4, resistances may be employed for the purpose and the field gradually increased as the current from the supply-circuit is introduced to the motor. This arrangement may of course be applied to the constructions shown in the other figures.

An important advantage of the apparatus above described lies in the fact that I am enabled to dispense with a number of contacts in the controller which would otherwise be necessary as speed-controlling steps for the dynamo and that in dispensing with these contacts the sparking which necessarily follows the handling of the large currents involved is avoided.

It may also be stated that with the construction shown in Figs. 1, 2, and 3 the resistance 7 may be omitted and the full current introduced to field 6 at once, in which case the voltage delivered by the dynamo will rise as the saturation of the field increases. I prefer, however, the use of the resistance for the purpose of controlling this rise in saturation.

Having thus described my invention, I declare that what I claim as new, and desire to secure by Letters Patent, is—

1. The combination of a common supply-circuit, a main motor, a dynamo, means for driving said dynamo from said supply-circuit, means for connecting said dynamo with the working motor, means for varying the strength of the field of the dynamo, a resistance in series with the armature of the motor, and a switch connected to the supply-circuit and adapted to make contact first with the means for varying the field of the dynamo, and then with the resistance in series with the armature of the motor, substantially as described.

2. The combination of a common supply-circuit, a main motor, a dynamo, means for driving said dynamo from said supply-circuit, means for connecting said dynamo with the working motor, means for varying the strength of the field of the dynamo, a resistance in series with the armature of the motor, and a switch connected to the supply-circuit and adapted to make contact first with the means for varying the field of the dynamo, and then with the resistance in series with the armature of the motor, and means for opening the circuit from the dynamo to the motor, substantially as described.

3. The combination of a common supply-circuit, a main motor, a dynamo having a series winding, means for driving said dynamo from said supply-circuit, means for connecting the dynamo in series with the armature of the main motor, a resistance in series with the armature of the motor, and a switch connected to the supply-circuit and adapted to make contact with the resistance, substantially as described.

4. The combination of a common supply-circuit, a main motor, a dynamo having a series winding, means for driving said dynamo from said supply-circuit, and means for connecting said dynamo in series with the armature of the main motor, substantially as described.

5. The combination of a common supply-circuit, a main motor, a dynamo having a series winding, means for driving the same from the supply-circuit, means for connecting the dynamo in series with the armature of the motor, and means for disconnecting the armature of the motor from the dynamo and connecting it to the supply-circuit, substantially as described.

6. The combination of a common supply-circuit, a main motor, a dynamo, means for driving the same from said supply-circuit and means for connecting it in series with the armature of the motor, means for varying the field of the dynamo, a variable resistance in series with the armature of the motor and means for disconnecting the armature of the motor from the dynamo when the field of the latter has a predetermined strength and for connecting the supply-circuit to said armature through said resistances, substantially as described.

7. The combination of a common supply-circuit, a main motor, a dynamo with a variable field, means for driving said dynamo from said supply-circuit, means for connecting the said dynamo to the motor, and a switch arranged to control said variable field and to introduce current from the supply-circuit to the motor, substantially as described.

8. The combination of a common supply-circuit, a main motor, a dynamo with a variable field, means for driving said dynamo from said supply-circuit, means for connecting said dynamo with the motor, and a controller arranged to introduce current from supply-circuit to the variable field of the dynamo, and then to deënergize said variable field and introduce current from the supply-circuit to the main motor, substantially as described.

9. The combination of a common supply-circuit, a main motor, a dynamo, having a series winding, means for driving said dynamo from said supply-circuit, means for connecting the dynamo to the armature of the motor, and means for breaking said connection and connecting the armature of the motor across the supply-circuit after the voltage delivered by the dynamo has reached a predetermined value, substantially as described.

10. The combination of a common supply-circuit, a main motor, a dynamo, means for driving said dynamo from said supply-circuit, means for connecting said dynamo with the working motor, a resistance in series with the armature of the motor, and a switch which first effects connections whereby the field of the dynamo is saturated, and then disconnects the motor from the dynamo and connects it across the supply-circuit through said resistance, substantially as described.

In testimony whereof I affix my signature in presence of two witnesses.

ROBERT T. LOZIER.

Witnesses:
C. V. EDWARDS,
E. A. HICKEY.